United States Patent [19]

Tateishi

[11] 4,185,390
[45] Jan. 29, 1980

[54] ELECTRONIC TAPE MEASURE WITH COMPARISON CAPABILITIES

[75] Inventor: Iwao Tateishi, Yamatokoriyama, Japan

[73] Assignee: Sharp Kabushiki Kaisha, Osaka, Japan

[21] Appl. No.: 854,210

[22] Filed: Nov. 23, 1977

[30] Foreign Application Priority Data

Nov. 30, 1976 [JP] Japan .......................... 51-162396[U]

[51] Int. Cl.$^2$ .............................................. G01B 3/12
[52] U.S. Cl. .............................. 33/139; 235/92 DN
[58] Field of Search ......... 235/92 DN, 92 PE, 1 MP, 235/92 R, 92 EV, 92 CA; 33/139, 140, 125, 138, 129, 132, 136; 340/266, 678, 688, 686; 364/560, 561, 562

[56] References Cited

U.S. PATENT DOCUMENTS

| | | | |
|---|---|---|---|
| 3,780,440 | 12/1973 | Taylor | 33/139 |
| 3,965,340 | 6/1976 | Renner | 235/92 DN |
| 4,006,472 | 2/1977 | Greene | 340/266 X |
| 4,031,360 | 6/1977 | Soule | 235/92 DN |

OTHER PUBLICATIONS

High Speed Counters by William Foley Product Engineering, 12/21/64, pp. 61-66.

Primary Examiner—Harry N. Haroian
Attorney, Agent, or Firm—Birch, Stewart, Kolasch & Birch

[57] ABSTRACT

In an electronic tape measure wherein the results of measurements are visually displayed on a display through the use of a counter, there is provided a keyboard unit for introducing a specific quantity into the tape measure. It further includes alarm means for providing an alarm signal when a tape is drawn in an amount to correspond to the specific quantity previously loaded into the counter via the keyboard unit.

13 Claims, 3 Drawing Figures

ELECTRONIC TAPE MEASURE WITH COMPARISON CAPABILITIES

BACKGROUND OF THE INVENTION

The present invention relates to an electronic tape measure with comparison capabilities.

It is well known in the field of tape measures that, while the tape is normally completely enclosed within the body of a measure, the amount of extension of the tape from the body is determined through the use of an electric circuit in operation. See, for example, U.S. Pat. No. 3,780,440 to James L. Taylor entitled MEASURING INSTRUMENT, and U.S. Pat. No. 3,526,890 to Jay Malina et al entitled LINEAR TAPE TRANSDUCER.

A tape measure can be used in either of two operating modes. Firstly, the operator draws a tape out of a reel and attaches the tape drawn from the reel onto an article to be measured in a manner such that the tip of the tape corresponds to the end of the article. Then, an amount of the drawing of the tape in mutual correspondence with the length of the article can be electrically determined within the tape measure. Alternatively, the operator extracts the tape by only a predetermined length so as to mark the predetermined length on the article by attachment of the tape extracted in this manner.

SUMMARY OF THE INVENTION

Accordingly, it is an object of the present invention to provide means effective for the latter method. An electronic tape measure of the present invention with a display capable of visually displaying the results of measurements via a counter, comprises input means for introduction of a specific quantity, and alarm means for providing an alarm signal when a tape is drawn in an amount corresponding to the specific quantity previously loaded into the counter via the input means. In other words, the specific quantity such as length information is contained within the interior of the tape measure via the input means. The operator may be notified when an amount of the drawing of the tape reaches correspondence to the specific quantity. Under the circumstances the tape drawn in accordance with the previously loaded specific quantity is attached onto an article to be measured to complete measurements.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A better understanding of the invention may be had from a consideration of the following detailed description taken in conjunction with the accompanying drawings in which.

DETAILED DESCRIPTION OF THE INVENTION

Figure 1:
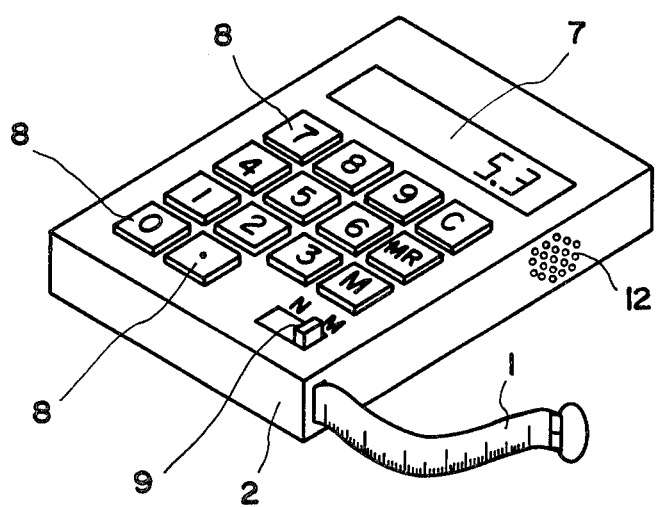
FIG. 1 is a perspective view of an electronic tape measure embodying the present invention.

Referring now to FIG. 1, there is illustrated in an electronic tape measure embodying the present invention a tape 1 marked off in units of inches or centimeters which is normally wound within the body 2 of the electronic tape measure in a manner such that the tip thereof is extendable easily from the body. Measurement procedure is carried out while extending the tape 1 from the body 2. An amount of such extension of the tape is sensed by a well known photo sensor 3 provided within the body and then converted into a series of electric pulse signals. The electric pulse signals are supplied to a counter 6 via an amplifer 4 and a waveform shaper 5. The contents of the counter are visually displayed on a display 7.

The electronic tape measure is further provided with an input unit 8 which comprises a plurality of digit and function keys and a mode selector 9. The mode selector 9 is of the slide switch type having two positions M and N. When the mode selector 9 is in the position M, an input unit 8, a control circuit 10, a memory 11 and the counter 6 will be all operable. Contrarily, the mode selector 9 present in the position N cuts off a path between the input unit 8 and the counter 6.

Figure 2:
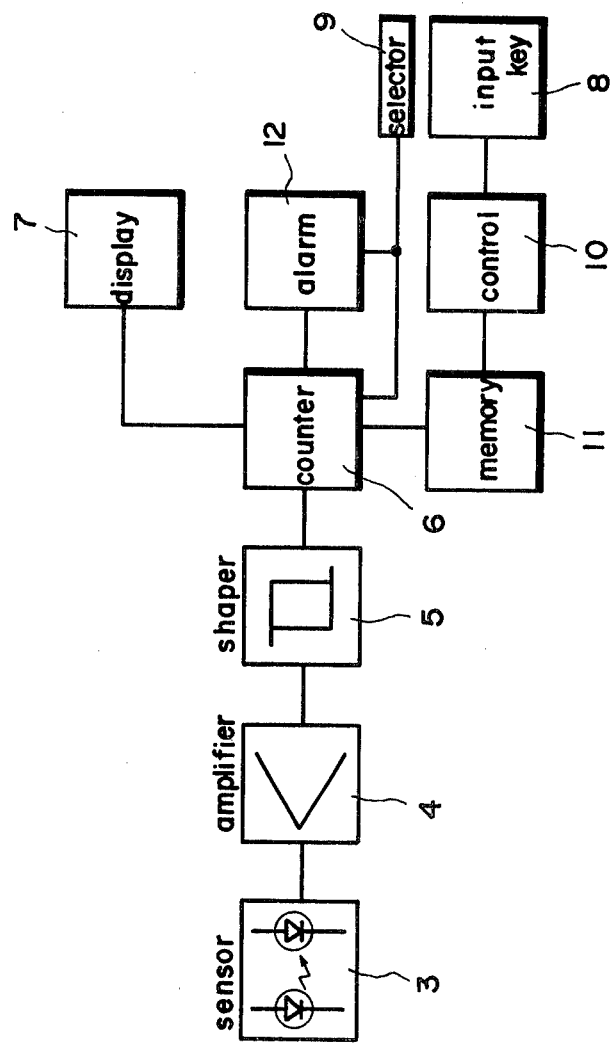
FIG. 2 is a block diagram comprising the electronic tape measure embodying the present invention.

With reference to FIG. 2, the following sets forth circuit construction of the electronic tape measure assuming that the mode selector 9 stands in the position M. As is seen in the field in an electronic calculator, the input unit 8 includes ten digit keys and a decimal point key. By using these keys, a specific quantity such as length, height, circumference of a circle and so on can be introduced into the electronic tape measure. The specific quantity applied via the input unit is held in the memory through the control circuit 10. The control circuit 10 is responsive to a memory key $\boxed{M}$, a memory recall key $\boxed{MR}$ and a clear key $\boxed{C}$. The specific quantity is transferred from the memory 11 to the counter 6 in accordance with combinations of depressions of the respective keys prior to measurement procedures. As a result, the display 7 provides a visual display of the specific quantity previously loaded into the memory 11.

When the mode selector 9 is in the position M, the counter 6 can serve as a well known down counter and an alarm unit 12 connected to the counter 6 is in the on state.

Under these circumstances, the operator draws the tape 1 out of the body 2 so that the counter 6 starts decrementing form the previously loaded count, namely, the specific quantity. When the counter 6 reaches a "O", that is, when the amount of extension of the tape is equal to the specific quantity, the alarm unit 12 receives a signal to provide an alarm signal. The alarm unit 12 may be a buzzer, a lamp, a pieze-effect transducer, etc.

When the mode selector 9 is shifted to the position N, connections between the counter 6 and the alarm unit 12 and the memory 11 are cut off so that the counter 6 serves as an up counter instead of the down counter. The display 7, therefore, provides a visual display of the amount of extension of the tape 1.

Figure 3:
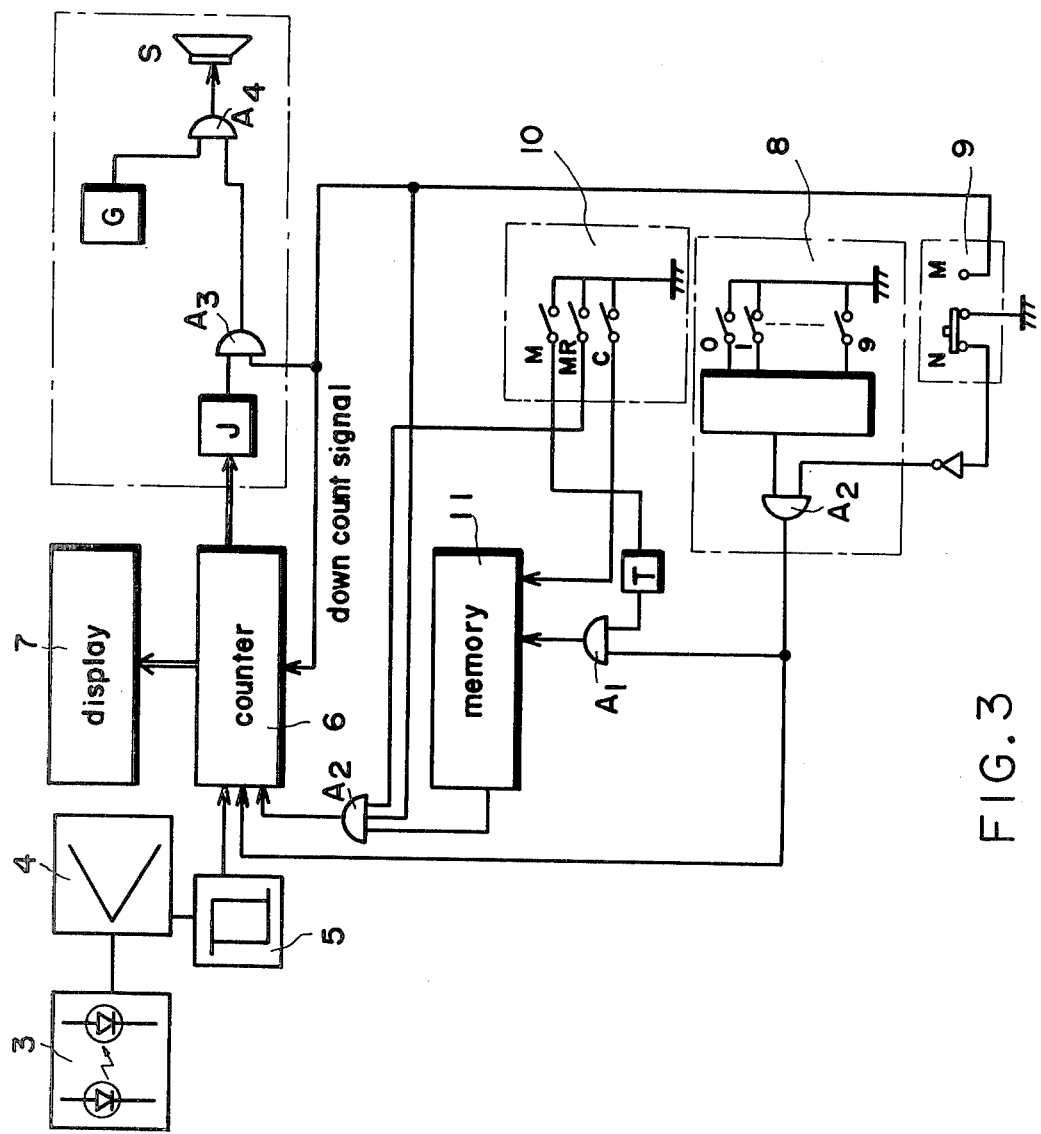
FIG. 3 is a more detailed block diagram of the electronic tape measure shown in FIG. 2.

FIG. 3 illustrates a more detailed diagram of the electronic tape measure wherein like parts are indicated by like numerals throughout the figures and referring in particular to FIG. 2. To load the memory 11 with the specific quantity, the memory key $\boxed{M}$ is manually operated to set a flip flop T. Subsequent to this, any of the digit keys $\boxed{0}$ – $\boxed{9}$ are operated so that information corresponding to that operated key or keys is transmitted via an AND gate $A_1$ to the memory 11. Upon depression of the memory recall key $\boxed{MR}$, the specific quantity information previously loaded into the memory is fed to the counter 6 via an AND gate $A_1$. In case it is desired to clear the contents of the memory 11, the clear key $\boxed{C}$ is manually operated to provide a clear signal. The counter 6 may be a conventional up/down counter and operates as a down counter when the mode selector 9 is in the position M and a down count signal is developed. The count of the counter 6 is reduced in accordance with the amount of extension of the tape 1. A judge circuit J provides the output thereof when the count of the counter 6 is "O". A pulse signal is developed from an oscillator G via and gate $A_3$ and $A_4$ to enable a speaker S. When the mode selector 9 is shifted to the position N, sound from the speaker S is precluded.

With such an arrangement, provided that the specific quantity is introduced and memorized via the input unit in advance, an alarm signal will be automatically provided when the tape is extended in the amount corresponding to the previously loaded specific quantity. It is not, therefore, necessary for the operator to remember that specific quantity. This reduces the possibility of mistakes. The present tape measure is most effective when it is desired to mark repeatedly a specific length on a large number of articles.

In addition, while in comparison of a spontaneous length being measured with a previously loaded length, the difference therebetween is visually displayed time after time since the counter in the preferred embodiment operates as a down counter.

While a certain representative embodiment and details have been shown for the purpose of illustrating the invention, it will be apparent to those skilled in this art that various changes and modifications may be made without departing from the spirit or scope of the invention, and all such modificaitons as would be obvious to one skilled in the art are intended to be included within the scope of the following claims.

What is claimed is:

1. An electronic tape measure enclosed within a housing and having a tape extendible and retractible therefrom, said housing having a calculator keyboard thereon, comprising:
   storing means for introducing and storing a predetermined specific quantity information into said tape measure via said keyboard, said storing means generating an output signal indicative of said predetermined specific quantity information, said specific quantity information being indicative of the length of an object to be measured;
   sensing means for sensing the length of said tape when pulled out from said housing, said sensing means generating a counting signal indicative of said length;
   coincidence detecting means, responsive to said output signal and said counting signal, for detecting the coincidence between said predetermined specific quantity information and the length of said tape when pulled out from said housing; and
   alarm means responsive to said coincidence between said predetermined specific quantity information and said length of said tape when pulled out from said housing, for generating an alarm signal.

2. An electronic tape measure in accordance with claim 1 further comprising:
   display means responsive to an output from said coincidence detecting means for displaying the arithmetic difference between said predetermined specific quantity information and the length of said tape pulled out from said housing.

3. An electronic tape measure in accordance with claim 1 wherein said coincidence detection means comprises a counter means responsive to said output signal and said counting signal for providing a count of said counting signals representing said length of said tape pulled out from said housing with respect to said output signal representing said predetermined specific quantity information generating a difference signal; and
   judge circuit means responsive to said difference signal for detecting the coincidence between said length of said tape pulled out from said housing and said predetermined specific quantity information thereby generating an alarm signal.

4. An electronic tape measure in accordance with claim 3 wherein said counter means comprises:
   selecting means on said housing for selecting a count-up or count-down mode of operation of said tape measure in response to said extensions of said tape from said housing thereby generating count-up or count-down signals, respectively;
   count-up means responsive to said counting signal and said count-up signal for generating signals representative of the length of extension of said tape from said housing; and
   count-down means responsive to said counting signal, said output signal and said count-down signal for generating a difference signal in accordance with said count-down signal, said difference signal being equal to the difference between said counting signal and said output signal.

5. An electronic tape measure in accordance with claim 4 wherein said count-up and count-down means comprise an up/down counter.

6. An electronic tape measure in accordance with claim 1 wherein said storing means comprises:
   data entry means on said housing for selecting a data entry mode, said data entry mode being utilized to enter said predetermined specific quantity information;
   keyboard means on said housing, said keyboard means comprising NUMERAL and FUNCTION keys; and
   storage control means, responsive to actuation of said keyboard means and said data entry means, for controlling the storage and storing said predetermined specific quantity information.

7. An electronic tape measure in accordance with claim 6 wherein said data entry means comprises a switch means on said housing for selecting a count-up or count-down mode of operation of said tape measure, said count-up mode being said data entry mode.

8. An electronic tape measure in accordance with claim 7 wherein said storage control means comprises:
   AND gate means responsive to actuation of said keyboard means and said data entry means in said data entry mode, for coordinating the simultaneous actuation of said function key on said keyboard while in said data entry mode; and memory means responsive to an output from said AND gate means for storing said predetermined specific quantity information entered via said keyboard.

9. An electronic tape measure in accordance with claim 1 wherein said alarm means comprises:
   a judge circuit means responsive to said coincidence for generating an intermediate output signal;
   means on said housing for generating a down count signal;
   means responsive to said intermediate output signal and said down count signal for generating an enabling signal;
   means for generating a pulse signal; and
   means responsive to said enabling signal and said pulse signal for generating an alarm signal, said alarm signal indicative of said coincidence between said predetermined specific quantity information and the length of said tape when pulled out from said housing.

10. An electronic tape measure in accordance with claim 5 wherein said storing means comprises:
    data entry means on said housing for selecting a data entry mode, said data entry mode being utilized to enter said predetermined specific quantity information;
    keyboard means on said housing, said keyboard means comprising NUMERAL and FUNCTION keys; and
    storage control means responsive to actuation of said keyboard means and said data entry means, for controllng the storage and storing said predetermined specific quantity information.

11. An electronic tape measure in accordance with claim 10 wherein said data entry means comprises a switch means on said housing for selecting a count-up or count-down mode of operation of said tape measure, said count-up mode being said date entry mode.

12. An electronic tape measure in accordance with claim 11 wherein said storage control comprises:
    AND gate means responsive to actuation of said keyboard means and said data entry means in said data entry mode for coordinating the simultaneous actuation of said function key with said numeral keys on said keyboard while in said data entry mode; and
    memory means responsive to an output from said AND gate means for storing said predetermined specific quantity information entered via said keyboard.

13. An electronic tape measure in accordance with claim 12 wherein said alarm means comprises:
    a judge circuit means responsive to said coincidence for generating an intermediate output signal;
    means on said housing for generating a down count signal;
    means responsive to said intermediate output signal and said down count signal for generating an enabling signal;
    means for generating a pulse signal; and
    means responsive to said enabling signal and said pulse signal for generating an alarm signal, said alarm signal indicative of said coincidence between said predetermined specific quantity information and the length of said tape when pulled out from said housing.

* * * * *